US008468263B2

(12) United States Patent
Fagan et al.

(10) Patent No.: US 8,468,263 B2
(45) Date of Patent: Jun. 18, 2013

(54) ONBOARD NETWORK SYSTEM ARCHITECTURE FOR IMPROVED COMMUNICATION AND METHOD OF USE

(75) Inventors: C. L. Fagan, Bellevue, WA (US); John Allen Craig, Jr., Snohomish, WA (US); Michael A. D'Annunzio, Seattle, WA (US); Ruben Laurens Martin, Bozeman, MT (US)

(73) Assignee: The Boeing Company, Chicago, IL (US)

( * ) Notice: Subject to any disclaimer, the term of this patent is extended or adjusted under 35 U.S.C. 154(b) by 830 days.

(21) Appl. No.: 12/370,423

(22) Filed: Feb. 12, 2009

(65) Prior Publication Data

US 2011/0176617 A1    Jul. 21, 2011

Related U.S. Application Data

(60) Provisional application No. 61/029,535, filed on Feb. 18, 2008.

(51) Int. Cl.
*G06F 15/16* (2006.01)
*G06F 3/00* (2006.01)
*G06F 9/44* (2006.01)

(52) U.S. Cl.
USPC ............................ 709/232; 717/173; 715/749

(58) Field of Classification Search
USPC ................. 709/220–221, 232; 715/748–749; 717/168–173
See application file for complete search history.

(56) References Cited

U.S. PATENT DOCUMENTS

| 6,353,779 | B1 | | 3/2002 | Simon et al. | |
|---|---|---|---|---|---|
| RE41,941 | E | * | 11/2010 | Eckert et al. | 709/246 |
| 2002/0004411 | A1 | * | 1/2002 | Heppe et al. | 455/552 |
| 2003/0217363 | A1 | | 11/2003 | Brady et al. | |
| 2006/0080451 | A1 | * | 4/2006 | Eckert | 709/230 |
| 2008/0037989 | A1 | * | 2/2008 | Stoner | 398/60 |
| 2009/0138872 | A1 | * | 5/2009 | Fuchs et al. | 717/173 |
| 2009/0138874 | A1 | * | 5/2009 | Beck et al. | 717/173 |

FOREIGN PATENT DOCUMENTS

| EP | 1798872 A2 | 6/2007 |
|---|---|---|
| WO | 0203572 A1 | 1/2002 |
| WO | 2008139062 A2 | 11/2008 |

* cited by examiner

*Primary Examiner* — Alina N. Boutah
(74) *Attorney, Agent, or Firm* — Yee & Associates, P.C.

(57) ABSTRACT

A method is present for transferring information in an aircraft network data processing system. A message is received from a process executing on the aircraft network data processing system for a destination to form a pending message. The pending message is received using a common protocol for processes executing in the aircraft network data processing system. A communication service is identified from a number of communication services for use in sending the message to the destination remote to the aircraft network data processing system to form a selected communication service in response to receiving the pending message. A new message is formed from the pending message. The new message has a format usable by an associated protocol for the selected communication service. The new message is sent to the destination using the selected communication service.

16 Claims, 11 Drawing Sheets

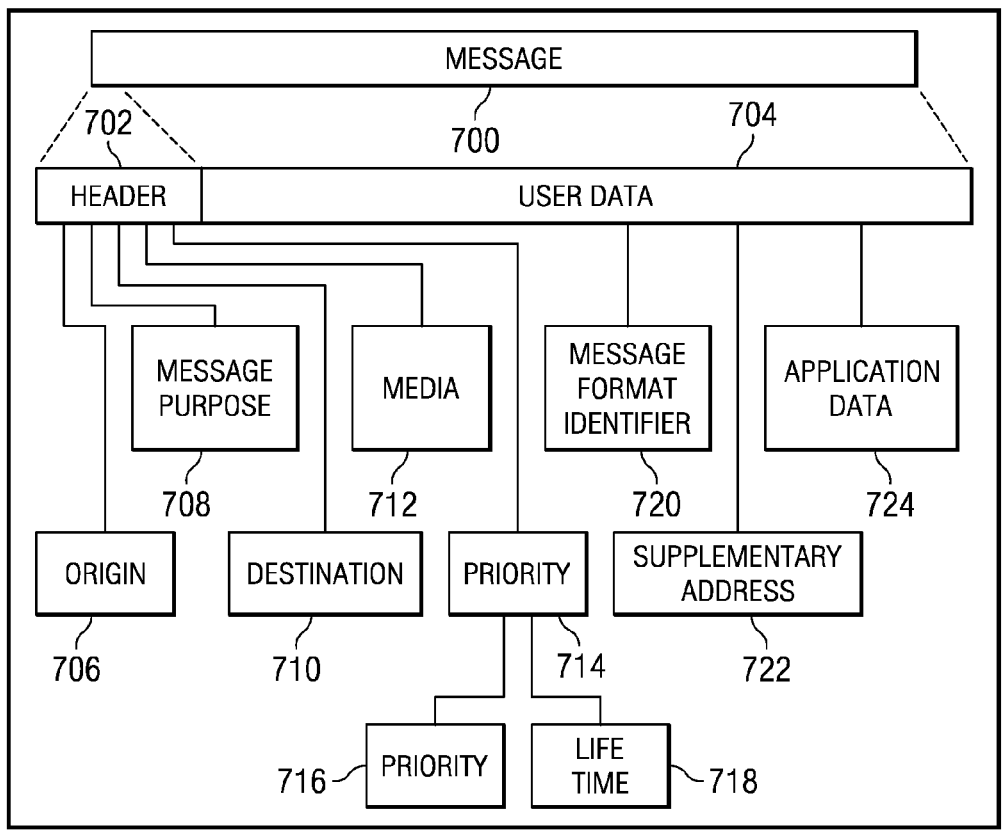
FIG. 7
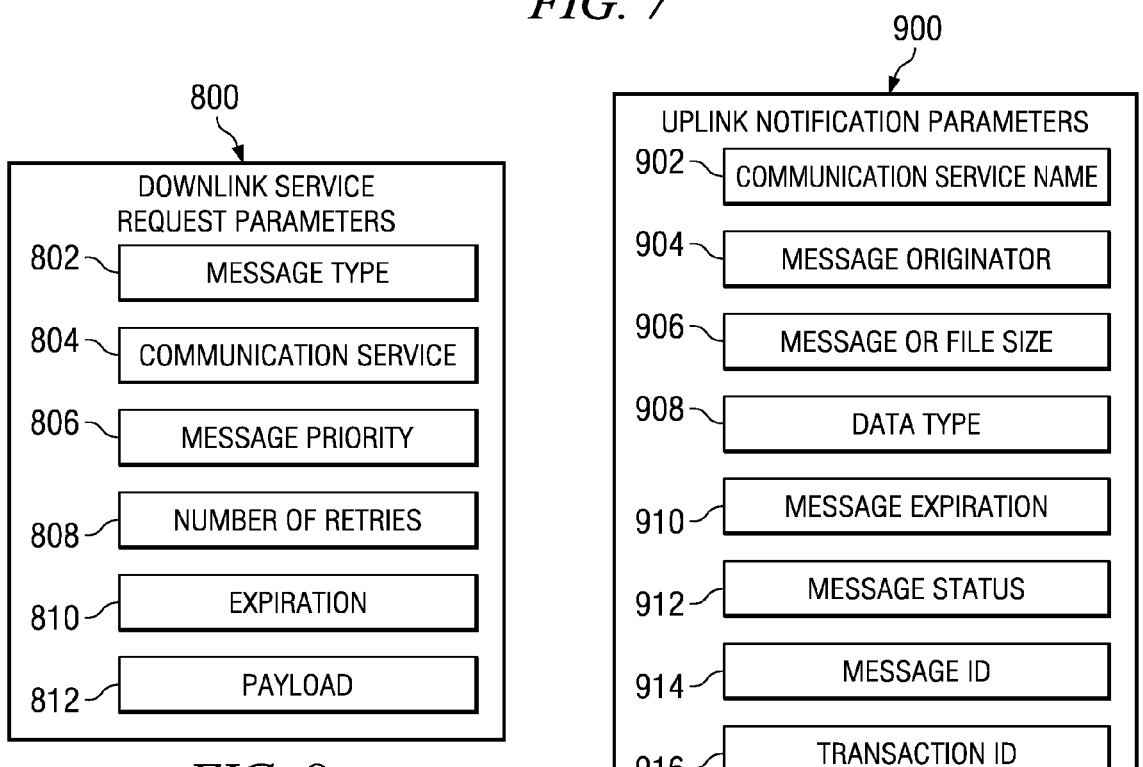
FIG. 8
FIG. 9

ONBOARD NETWORK SYSTEM ARCHITECTURE FOR IMPROVED COMMUNICATION AND METHOD OF USE

CROSS REFERENCE TO RELATED APPLICATION

This application claims the benefit of the filing date of corresponding U.S. Provisional Patent Application No. 61/029,535, entitled "Onboard Network System (ONS) Network Architecture", filed Feb. 18, 2008.

BACKGROUND INFORMATION

1. Field

The present disclosure relates generally to an improved data processing system and, in particular, to a method and apparatus for exchanging information between different software components. Still more particularly, the present disclosure relates to a method and apparatus for exchanging information between software components on a network data processing system located in an aircraft.

2. Background

Modern aircraft are extremely complex. For example, an aircraft may have many types of electronic systems on board. A particular electronic system on an aircraft may also be referred to as a line replaceable unit (LRU). Each line replaceable unit may further take on various forms. A line replaceable unit may be, for example, without limitation, a flight management system, an autopilot, an in-flight entertainment system, a communications system, a navigation system, a flight controller, a flight recorder, an engine monitoring unit, and a collision avoidance system.

Line replaceable units may use software or programming to provide the logic or control for various operations and functions. The software used in these line replaceable units is commonly treated as parts in the airline industry. In particular, a software application for use in a line replaceable unit on an aircraft may also be tracked separately and referred to as a loadable software aircraft part (LSAP) or software aircraft parts.

These line replaceable units and other devices on an aircraft may be part of an aircraft network data processing system. With network connections, wireless and wired, these different line replaceable units may exchange information with each other, as well as with devices off of the aircraft.

Communications between different line replaceable units and other components may communicate using different standards, protocols, messaging systems, hardware, and other components. For example, some components in an aircraft may use aircraft communications addressing and reporting system (ACARS) for transmitting messages off board. This protocol and other off-board protocols such as, for example, Onboard Electronic Distribution System (OBEDS), terminal wireless local area networks (LAN) units, and/or other protocols, require that the line replaceable units associated with these protocols understand and transmit data using the protocols associated with the receiving line replaceable unit and/or other components.

As new off-board communication services are added to the aircraft, each line replaceable unit will be required to interface to a new or revised protocol or interface. Other devices in the aircraft network data processing system will require updates to the software or new versions of software that use these new types of communication services. In some instances, different services for exchanging information between devices may be used by different line replaceable units. As a result, some line replaceable units may not be able to communicate with other line replaceable units.

As new types of communication services are used, updates to existing software are implemented for the different line replaceable units on an aircraft to allow those components to be able to communicate with each other and other devices.

In another example, if an electronic flight bag is being used in an aircraft, changes to the local area network in the aircraft may require a new device driver for the electronic flight bag. This new device driver is needed in order to allow the electronic flight bag to communicate with the aircraft over the wireless local area network. As a result, updating an aircraft network data processing system to use new and/or different types of communication services to exchange information with other line replaceable units on the aircraft or computing devices off the aircraft may be expensive and/or time consuming.

Therefore, it would be advantageous to have an improved method and apparatus for providing communications between different data processing systems on an aircraft network data processing system.

SUMMARY

In one advantageous embodiment, a method is present for transferring information in an aircraft network data processing system. A message is received from a process executing on the aircraft network data processing system for a destination to form a pending message. The pending message is received using a common protocol for processes executing in the aircraft network data processing system. A communication service is identified from a number of communication services for use in sending the message to the destination remote to the aircraft network data processing system to form a selected communication service in response to receiving the pending message. A new message is formed from the pending message. The new message has a format usable by an associated protocol for the selected communication service. The new message is sent to the destination using the selected communication service.

In another advantageous embodiment, an aircraft network data processing system comprises a network, a plurality of line replaceable units connected to the network, a number of server computers connected to the network, and a server process. The server process is capable of being executed on the number of server computers to receive a message from a process executing on a line replaceable unit in the aircraft network data processing system for a destination to form a pending message. The pending message is received using a common protocol for processes executing on the plurality of line replaceable units in the aircraft network data processing system. The server process is capable of identifying a communication service from a number of communication services for use in sending the message to the destination remote to the aircraft network data processing system to form a selected communication service in response to receiving the pending message. The server process is also capable of forming a new message from the pending message. The new message has a format usable by an associated protocol for the selected communication service. The new message is sent to the destination using the selected communication service.

In yet another advantageous embodiment, a computer program product for transferring information in an aircraft network data processing system comprises a computer recordable storage medium and program code stored on the computer recordable storage medium. Program code is present for receiving a message from a process executing in the aircraft network data processing system for a destination to form a pending message. The pending message is received using a common protocol for processes executing in the aircraft network data processing system. Program code is also present for identifying a communication service from a number of communication services for use in sending the message to the destination remote to the aircraft network data processing system to form a selected communication service in response to receiving the pending message. Program code is present for forming a new message from the pending message. The new message has a format usable by an associated protocol for the selected communication service. Further, program code is present for sending the new message to the destination using the selected communication service.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 7 is a block diagram of a message format for a message in accordance with an advantageous embodiment;

FIG. 8 is a block diagram of downlink request parameters in accordance with an advantageous embodiment;

FIG. 9 is a block diagram of uplink notification parameters in accordance with an advantageous embodiment;

DETAILED DESCRIPTION

Figure 1:
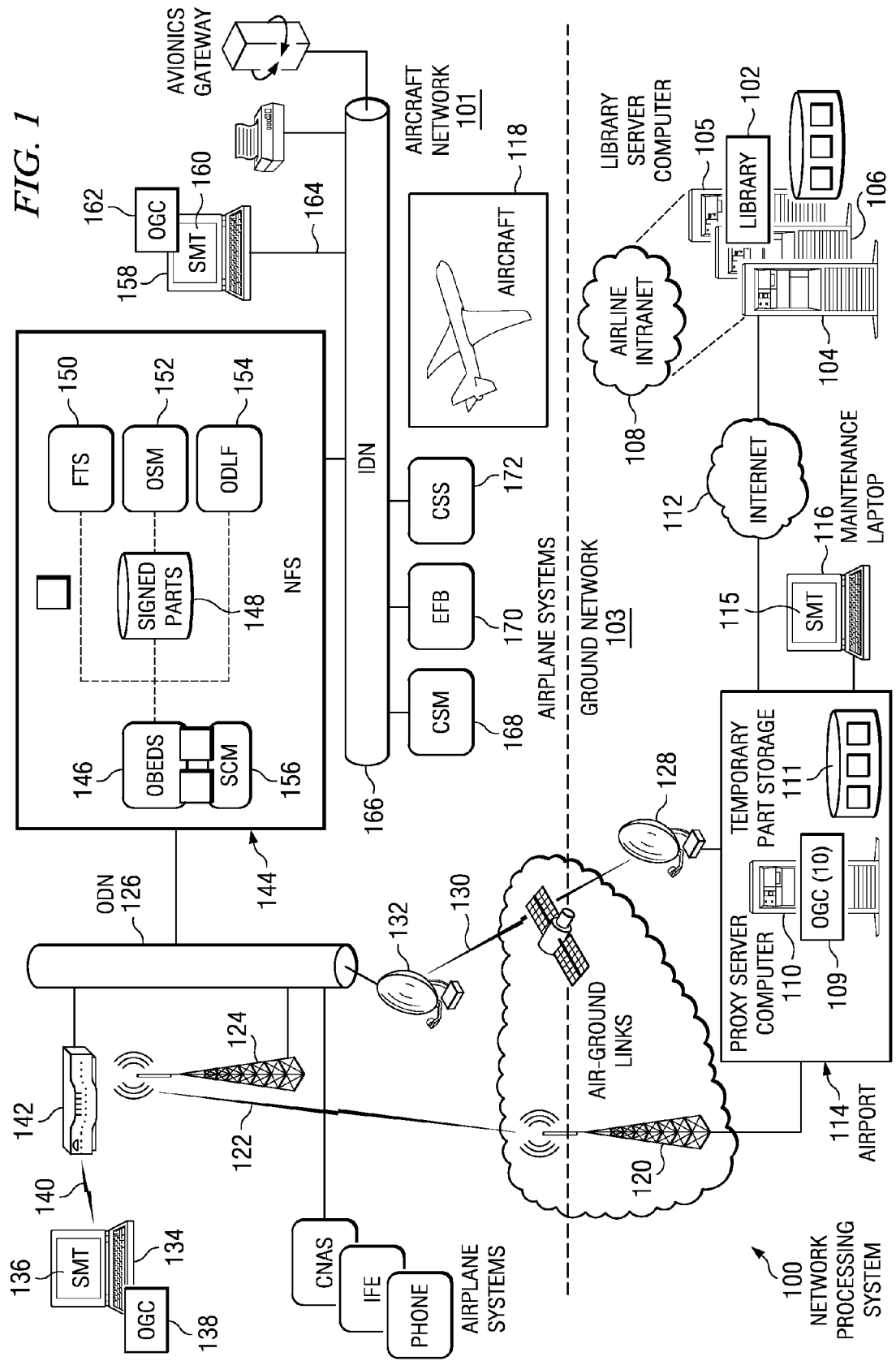
FIG. 1 is a diagram illustrating a network data processing system in which a software part management environment may be implemented in accordance with an advantageous embodiment.

With reference now to the figures and, in particular, with reference to FIG. 1, a diagram illustrating a network data processing system in which a software part management environment may be implemented is depicted in accordance with an advantageous embodiment. In this example, network data processing system 100 is a network data processing system in which information may be transferred between aircraft network 101 and ground network 103. This information may include, for example, without limitation, commands, software aircraft parts, downlink data, error logs, usage history, flight date, status information, and manuals. Ground network 103 includes networks and computers located on the ground. Aircraft network system 101 is a network of computers located on an aircraft.

In these examples, commands may be generated on library 102 located on library server computer 104. The commands may be, for example, commands to load software aircraft parts, commands to downlink data, and/or commands to perform other suitable operations. Library server computer 104 and other data processing systems, such as server computers 105 and 106, connect to intranet 108.

These commands may be distributed to on ground component (OGC) 109 on proxy server computer 110 through a network, such as Internet 112. Intranet 108 and Internet 112 may include connections, such as, for example, wires, fiber optic cables, or wireless communications links. Proxy server computer 110 may be located in a facility, such as airport 114. Proxy servers, such as proxy server computer 110, may be located at other airports and other locations, such as maintenance locations. Proxy server computer 110 provides for temporary part storage 111 for commands and parts received from library 102.

The commands and software aircraft parts also may be sent to software maintenance tools on portable computers, such as software maintenance tool 115 on maintenance laptop 116. Proxy server computer 110 and maintenance laptop 116 are referred to collectively as ground tools. A ground tool may be any data processing system that is configured with an appropriate application to transfer information, such as commands, software aircraft parts, and downlink data.

Proxy server computer 110 may connect to aircraft 118 through various types of connections or links. For example, wireless unit 120 may establish wireless connection 122 with wireless unit 124 on aircraft 118. Wireless unit 124 connects to open data network 126 in aircraft 118. Maintenance laptop 134 has software maintenance tool 136 and on ground component (OGC) 138 and may communicate with aircraft 118 establishing communications link 140 with cabin wireless access unit 142. Communications link 140 is a wireless virtual private network tunnel. Cabin wireless access unit 142 connects to open data network 126 in these examples. Open data network 126 provides an interface for various communications links, such as wireless link 122.

Additionally, satellite unit 128 connected to proxy server computer 110 at airport 114 may establish satellite link 130 with satellite unit 132, which is also connected to open data network 126.

Open data network 126 connects to aircraft data processing system 144, which contains onboard electronic distribution system (OBEDS) 146. Storage device 148 also is located in aircraft data processing system 144. Storage device 148 provides a location to store information, such as aircraft parts.

Aircraft data processing system 144 also includes file transfer system (FTS) 150, onboard storage manager (OSM) 152, onboard data load function (ODLF) 154, and signer-crater module (SCM) 156. In these examples, signer-crater module 156 may be implemented as a Java® library compiled into onboard electronic distribution system 146. Also, aircraft data processing system 144 may take the form of a network file server computer (NFS).

File transfer system 150 is used to transfer files from storage device 148 to line replaceable units. Onboard storage manager 152 manages information stored in storage device 148. Onboard data load function 154 is a software component used to load software aircraft parts onto line replaceable units. Signer-crater module 156 is used to process incoming crates and store the contents of those crates in storage device 148. Additionally, signer-crater module 156 may crate download data for downloading to proxy server computer 110.

All command processing, in these examples, is initiated by onboard electronic distribution system 146 located in aircraft data processing system 144. Onboard electronic distribution system 146 monitors the air-to-ground link status and determines whether a communications link has been established. If a link becomes available, onboard electronic distribution system 146 connects to a ground data processing system via the link.

In other advantageous embodiments, maintenance laptop 158 may establish communications link 164 with isolated data network 166. Maintenance laptop 158 has software maintenance tool 160 and on ground component 162. Communications link 164 may be a wired connection. The line replaceable units may be, for example, central server module (CSM) 168, electronic flight bag (EFB) 170, and cabin services system (CSS) 172. Central server module 168 provides common networking functions for the different networks in aircraft 118. These services include, for example, packet routing, firewall, and wireless access. Cabin services system 172 provides applications to control systems in the aircraft, such as lighting, cabin doors, and address system.

If onboard electronic distribution system 146 establishes a connection to a ground device, onboard electronic distribution system 146 requests a list of commands queued or stored for aircraft 118. Onboard ground components 109, 138, or 162 on data processing systems, such as proxy server computer 110, maintenance laptop 134, and/or maintenance laptop 158, communicate with onboard electronic distribution system 146 on aircraft data processing system 144 in these examples. This type of software component provides an application program interface to the ground tool to uplink commands and software aircraft parts to aircraft 118 as well as down linking data or files.

The illustration of particular components and configurations in network data processing system 100 are not meant to imply architectural limitations to the manner in which different embodiments may be implemented. For example, although only a single aircraft is shown in aircraft network 101, multiple aircraft may be present within aircraft network 101. As another example, aircraft network 101 and ground network 103 may connect to computers, such as proxy server computer 110 at airports, such as airport 114, through other types of networks other than Internet 112. For example, a wide area network (WAN) may be used in place of or in conjunction with Internet 112.

Figure 2:
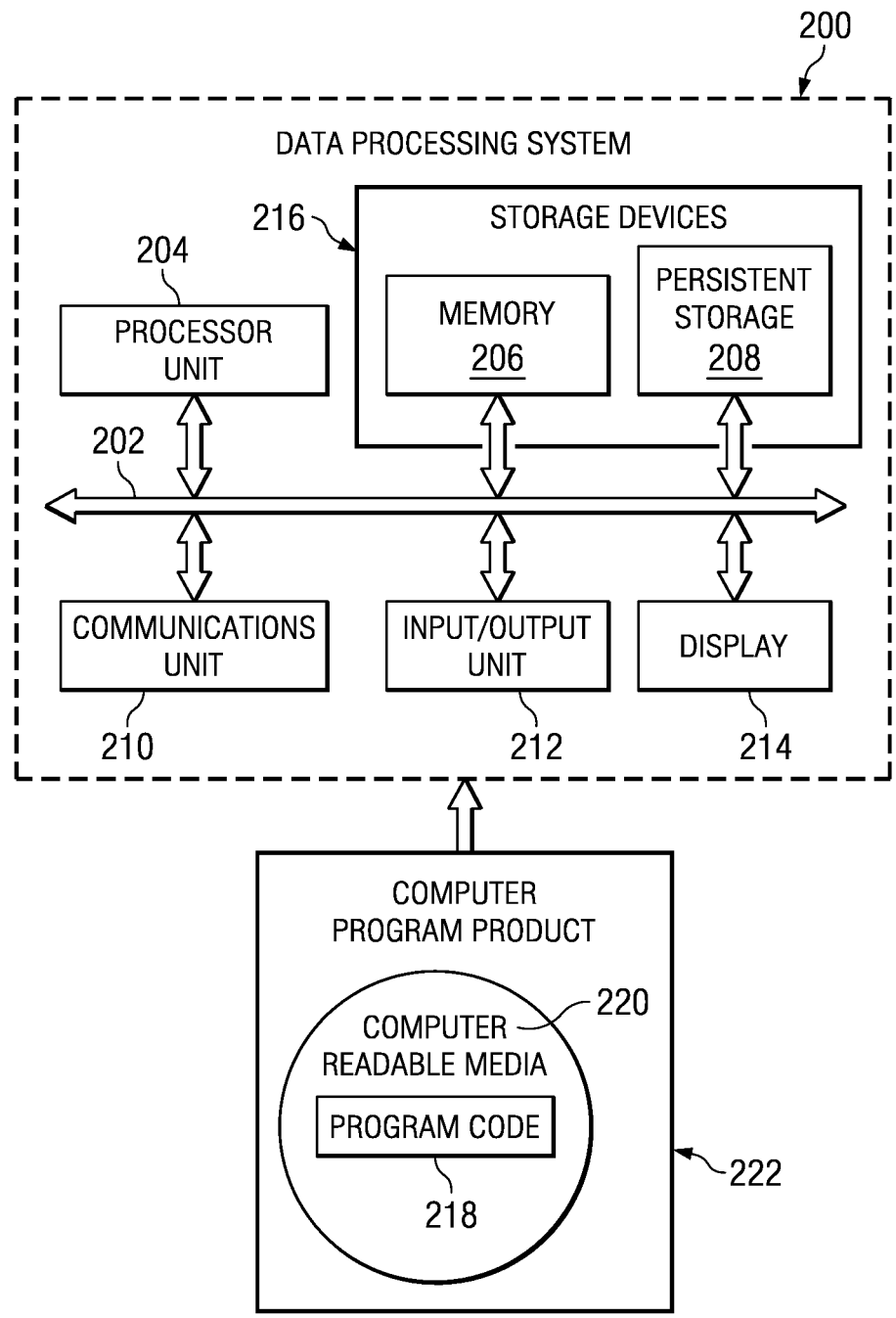
FIG. 2 is a block diagram of a data processing system in accordance with an advantageous embodiment.

Turning now to FIG. 2, a block diagram of a data processing system is depicted in accordance with an advantageous embodiment. Data processing system 200 is an example of a data processing system that may be used to implement servers and clients, such as server computer 104 and server computer 110 in FIG. 1. Further, data processing system 200 maybe used to implement a line replaceable unit or some other data processing system in aircraft 118 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information such as, for example, without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be in a tangible form such as, for example, an optical or magnetic disk that is inserted or placed into a drive or other device that is part of persistent storage 208 for transfer onto a storage device, such as a hard drive that is part of persistent storage 208.

In a tangible form, computer readable media 218 also may take the form of a persistent storage, such as a hard drive, a thumb drive, or a flash memory that is connected to data processing system 200. The tangible form of computer readable media 220 is also referred to as computer recordable storage media. In some instances, computer readable media 220 may not be removable.

Alternatively, program code 218 may be transferred to data processing system 200 from computer readable media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form. In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize and take into account that currently existing systems require that line replaceable units understand, send, and receive data using the specific protocols associated with the other line replaceable units and/or other components with which the line replaceable units are communicating.

Further, the different advantageous embodiments recognize and take into account that as new off-board communication services are added for an aircraft, each line replaceable unit may be required to interface to the new and/or revised communication services or protocols. Other devices in the aircraft network data processing system may require updates to the software or new versions of software using the new and/or revised communication services.

The different advantageous embodiments also recognize and take into account that different communication services for exchanging information may be used by different line replaceable units and devices. As a result, some line replaceable units may not be able to communicate with other line replaceable units.

The different advantageous embodiments recognize and take into account that new and/or revised communications links may require new device drivers for line replaceable units to allow the line replaceable units to communicate over the new and/or revised communications links. Updating an aircraft network data processing system in this manner may be expensive and/or time consuming. Thus, the different advantageous embodiments provide a method and apparatus for taking into account the considerations described above.

The different advantageous embodiments provide a method for transferring information in an aircraft network data processing system. A message is received from a process executing on the aircraft network data processing system for a destination to form a pending message. The pending message is received using a common protocol for processes executing in the aircraft network data processing system.

A communication service is identified from a number of communication services for use in sending the message to the destination remote to the aircraft network data processing system to form a selected communication service in response to receiving the pending message. A new message is formed from the pending message. The new message has a format usable by an associated protocol for the selected communication service. The new message is sent to the destination using the selected communication service.

Figure 3:
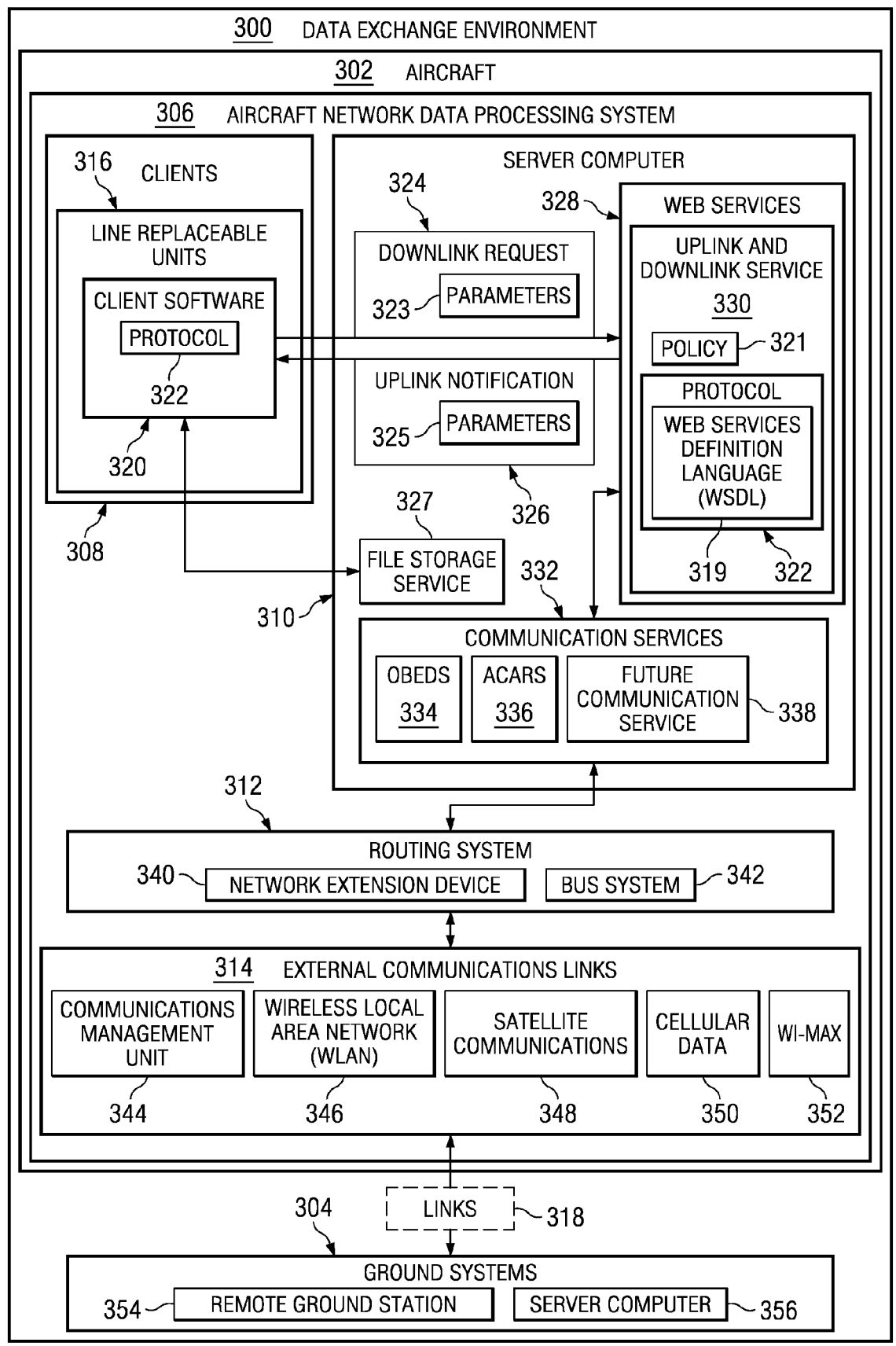
FIG. 3 is a block diagram of a data exchange environment in accordance with an advantageous embodiment.

With reference now to FIG. 3, a block diagram of a data exchange environment is depicted in accordance with an advantageous embodiment. Data exchange environment 300 is one example of one implementation for network data processing system 100 in FIG. 1. In these illustrative examples, data exchange environment 300 may be implemented for the exchange of information between aircraft 302 and ground systems 304. Information may be anything that can be exchanged between different processes and/or devices in data exchange environment 300. For example, information may be data, messages, commands, programs, files, logs, and/or other suitable types of information.

In these examples, aircraft 302 has aircraft network data processing system 306, which may be one example of one implementation of data processing system 200 in FIG. 2. Aircraft network data processing system 306 may include clients 308, server computer 310, routing system 312, external communications links 314, and/or other suitable components. Clients 308 may be electronic systems such as, for example, without limitation, line replaceable units 316.

Server computer 310 may exchange information with both clients 308 and external communications links 314. In these examples, server computer 310 exchanges information with external communications links 314 using routing system 312. External communications links 314 exchange information with ground systems 304 using links 318. Links 318 may include any form of link or communication such as, for example, without limitation, radio, satellite communication (SATCOM), high frequency (HF) radio, very high frequency (VHF) radio, ultra high frequency (UHF) radio, Ethernet cables, serial cables, optical cables, and/or some other suitable form of wireless and/or physical link.

Line replaceable units 316 may have client software 320. Client software 320 may include any software application or process executing on line replaceable units 316. In these illustrative examples, client software 320 sends and receives information to and from server computer 310 using a standard protocol, such as protocol 322. Protocol 322 may be any standard protocol such as, for example, without limitation, simple object access protocol (SOAP), as specified by a web services definition language (WSDL), hypertext transfer protocol (HTTP), the internet protocol suite (TCP/IP), and/or other suitable protocols. In these illustrative examples, protocol 322 is a protocol as specified by web services definition language (WSDL) 319.

For example, client software 320 may send downlink request 324 to server computer 310 using the simple object access protocol (SOAP), as specified by web services definition language (WSDL) 319 for protocol 322. In a similar manner, client software 320 may receive uplink notification 326 from server computer 310 using protocol 322. Downlink request 324 may have parameters 323, and uplink notification 326 may have parameters 325. In other examples, client software 320 and server computer 310 may exchange information in the form of files. Further, client software 320 may send and receive information to and from file storage service 327 within server computer 310. File storage service 327 may be a private file storage area for server computer 310.

Server computer 310 sends and receives information to and from clients 308 using web services 328. Web services 328 are software processes that support communication between systems over a network. For example, web services 328 support communication between client processes and server processes over a network. In these examples, web services 328 support communication between client software 320 and server computer 310. One example of a web service within web services 328 may be uplink and downlink service 330.

Both client software 320 and uplink and downlink service 330 exchange information using protocol 322, as specified by web services definition language (WSDL) 319. Information received from client software 320 may be modified by uplink and downlink service 330 to be sent to communication services 332. Uplink and downlink service 330 does not change the format or data type of the information sent by client software 320. In other words, uplink and downlink service 330 may encapsulate the information sent by client software 320 using a different format to preserve the original information during its exchange to communication services 332 and ground systems 304.

Uplink and downlink service 330 may select a communication service within communication services 332 to send information or receive information based on a value of a parameter within the information being exchanged. This parameter may be, for example, a parameter within parameters 323 or parameters 325. Uplink and downlink service 330 exchanges information with communication services 332 using specific interfaces for each of the different communication services within communication services 332.

In these examples, communication services 332 may include onboard electronic distribution system (OBEDS) 334, aircraft communications addressing and reporting system (ACARS) 336, future communication service 338, and/or some other suitable communication service. Future communication service 338 may be some communication service that has yet to be developed. Further, in these illustrative examples, communication services 332 may be off-board communication service providers.

In this manner, uplink and downlink service 330 provides a way for client software 320 and communication services 332 to exchange data in an isolated fashion. In other words, uplink and downlink service 330 acts as a common hub for both client software 320 and communication services 332. The use of uplink and downlink service 330 allows for client software 320 not requiring specific interfaces for each of the communication services within communication services 332.

Communication services 332 exchange information with external communications links 314 using routing system 312. Routing system 312 may be a system of hardware and/or software components used for connecting server computer 310 and external communications links 314. Routing system 312 may include switch and routing components such as, for example, network extension device 340, bus system 342, and/or other suitable components.

In these illustrative examples, network extension device 340 is a system of hardware and software components that extends the network for and connects to both server computer 310 and external communications links 314. In these illustrative examples, network extension device 340 may be connected to server computer 310 through Ethernet cables, wires, and/or some other suitable component. Network extension device 340 may be a hub, a switch plus roller device, a wireless access point, and/or some other device or system capable of extending a network.

Further, network extension device 340 may be connected to external communications links 314 through bus system 342. Bus system 342 may be a bus system such as, for example, without limitation, a 2-wire serial bus system. One example of this type of bus system is the ARINC 429 bus system, developed by Aeronautical Radio, Incorporated (ARINC).

External communications links 314 may include a number of communications links including, but not limited to, communications management unit 344, wireless local area network (WLAN) 346, satellite communications 348, and/or other suitable communications links. Satellite communications 348 may include a high-speed communications link based on satellites and/or broadband global area network (BGAN) technology. Further, future communications links within external communications links 314 may include cellular data 350, Worldwide Interoperability for Microwave Access (WiMax) 352, and/or other future communications links.

In these illustrative examples, uplink and downlink service 330 selects the communications link within external communications links 314 to be used for sending information based on policy 321. For example, policy 321 may provide a priority list of communications links within external communications links 314 for uplink and downlink service 330. The level of priority for a communications link may be dependent on speed of service, cost of service, flight status, quality of service, and/or other criteria. In other advantageous embodiments, clients 308 may be able to specify the particular communications link to be used.

In these examples, communications management unit 344 is a line replaceable unit within aircraft 302. Communications management unit 344 is a communications router that supports data link service access between aircraft 302 and ground systems 304. In these examples, ground systems 304 may include remote ground station 354, server computer 356, and/or other suitable ground systems.

In one example, network extension device 340 may connect to a number of ports on communications management unit 344. Information sent through routing system 312 from server computer 310 may be sent to communications management unit 344 and then to ground systems 304 using a link within links 318. In another example, information sent to communications management unit 344 from ground systems 304 using a link within links 318 may be sent to server computer 310 using routing system 312.

The illustration of data exchange environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
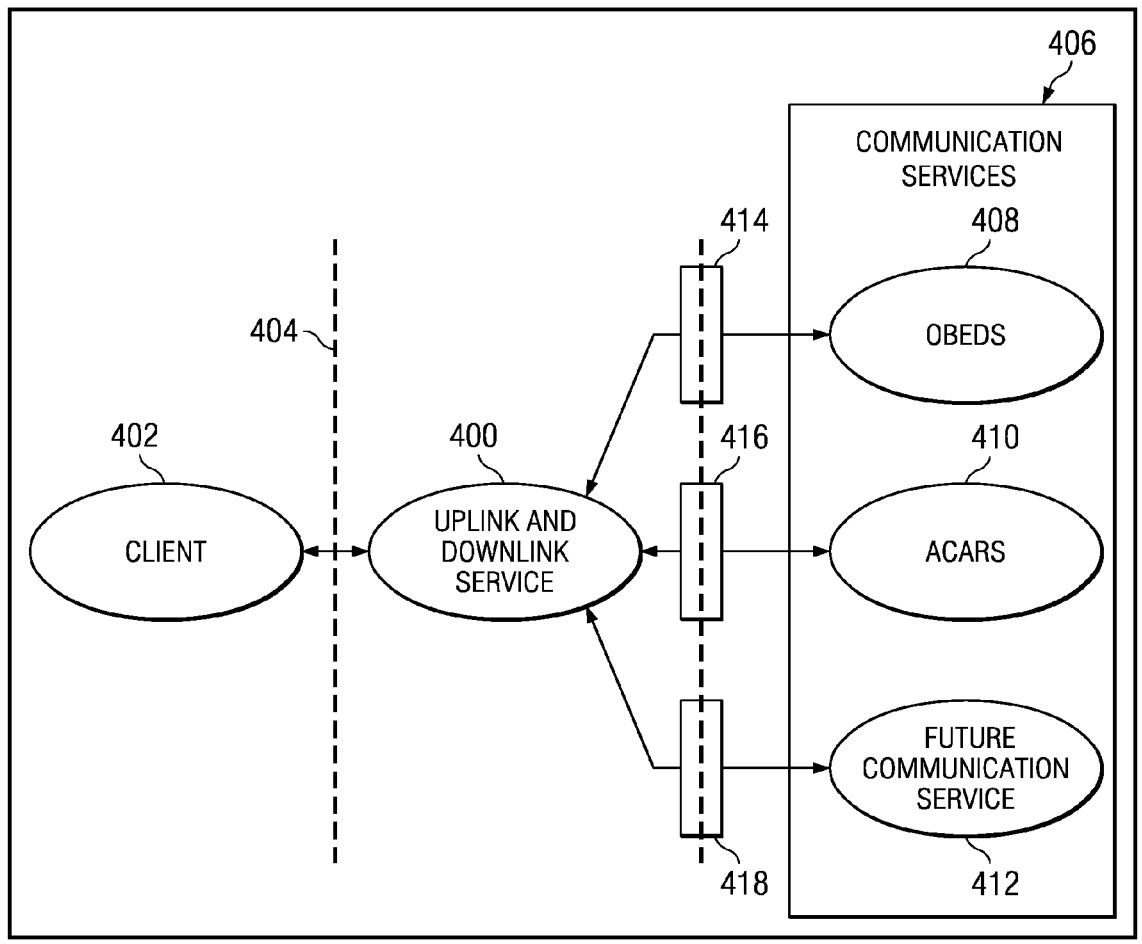
FIG. 4 is a diagram of the architecture of an uplink and downlink service in accordance with an advantageous embodiment.

With reference now to FIG. 4, a diagram of the architecture of an uplink and downlink service is depicted in accordance with an advantageous embodiment. In these examples, uplink and downlink service 400 is one example of one implementation for uplink and downlink service 330 in FIG. 3. Client 402 may be one example of a client within clients 308 in FIG. 3. For example, client 402 may be one of line replaceable units 316 in FIG. 3.

In these illustrative examples, uplink and downlink service 400 exchanges information with client 402 over network 404. Network 404 may be any type of network such as, for example, without limitation, an Ethernet network. Client 402 may send downlink requests to and may receive uplink notifications from uplink and downlink service 400 using network 404.

Uplink and downlink service 400 further provides a process for client 402 to exchange information with communication services 406. Communication services 406 may be examples of communication services 332 in FIG. 3. Communication services 406 may include onboard electronic distribution system (OBEDS) 408, aircraft communications addressing and reporting system (ACARS) 410, and/or future communication service 412.

Uplink and downlink service 400 provides a common hub for the exchange of information. In this manner, clients, such as client 402, do not need to exchange information using specific interfaces for each of the communication services within communication services 406. For example, client 402 sends and/or receives information from uplink and downlink service 400 using only one interface, such as network 404. Uplink and downlink service 400 exchanges information between client 402 and communication services 406 using specific interfaces for each of communication services 406.

In these illustrative examples, uplink and downlink service 400 uses interface 414 to exchange information with onboard electronic distribution system (OBEDS) 408, interface 416 to exchange information with aircraft communications addressing and reporting system (ACARS) 410, and interface 418 to exchange information with future communication service 412. In this manner, uplink and downlink service 400 allows for the isolation and independence of clients and communication services.

Figure 5:
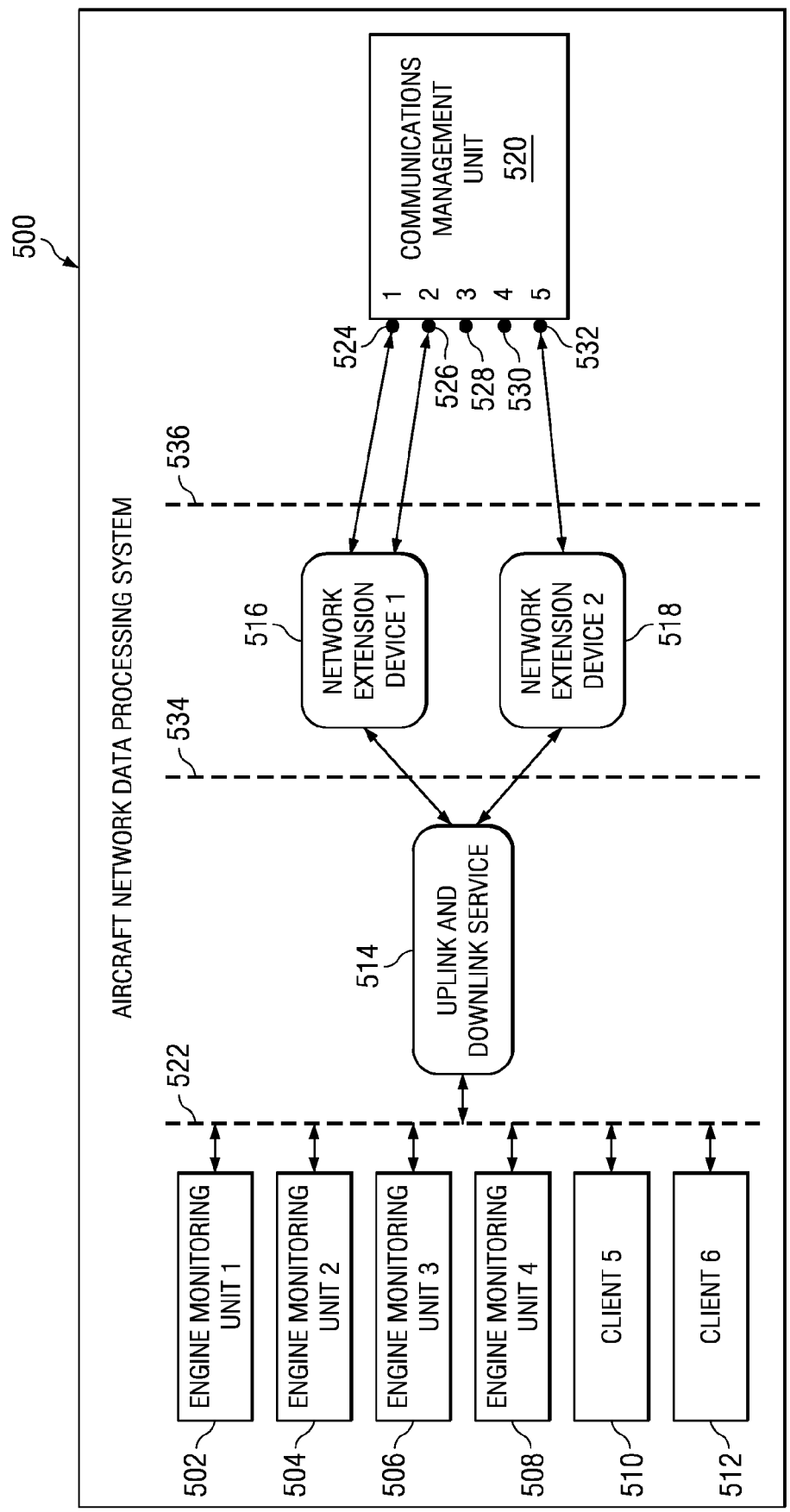
FIG. 5 is a diagram of a portion of an aircraft network data processing system in accordance with an advantageous embodiment.

With reference now to FIG. 5, a diagram of a portion of an aircraft network data processing system is depicted in accordance with an advantageous embodiment. In these illustrative examples, aircraft network data processing system 500 is one example of a portion of an aircraft network data processing system such as, for example, aircraft network data processing system 306 in FIG. 3.

Aircraft network data processing system 500 may include clients such as, for example, engine monitoring unit 1 502, engine monitoring unit 2 504, engine monitoring unit 3 506, engine monitoring unit 4 508, client 5 510, and client 6 512. In these examples, these clients are examples of clients, such as clients 308 in FIG. 3. Further, these clients may have client software applications and/or processes acting on the clients.

Aircraft network data processing system 500 may also include uplink and downlink service 514, network extension device 1 516, network extension device 2 518, and communications management unit 520. Uplink and downlink service 514 is one example of one implementation for uplink and downlink service 330 in FIG. 3.

Network extension device 1 516 and network extension device 2 518 are examples of an implementation for network extension device 340 in FIG. 3. Communications management unit 520 is one example of an implementation for communications management unit 344 in FIG. 3.

An exchange of information as initiated by a downlink request such as, for example, downlink request 324 in FIG. 3 may be illustrated in FIG. 5. Engine monitoring unit 3 506 submits a downlink request using uplink and downlink service 514 to downlink a file from a ground system. This ground system may be a ground system such as, for example, remote ground station 354 or server computer 356 in ground systems 304 in FIG. 3.

Engine monitoring unit 3 506 sends the downlink request to uplink and downlink service 514 over network 522 using a standard protocol such as, for example, without limitation, simple object access protocol (SOAP) as specified by a web services definition language (WSDL). In these examples, all of the clients use the same standard protocol for sending and receiving information. In these examples, network 522 may be any type of network such as, for example, without limitation, an Ethernet network.

In these illustrative examples, uplink and downlink service 514 uses the name of the client to determine a specific parameter for sending information for the client. Uplink and downlink service 514 uses the name of engine monitoring unit 3 506 to determine the port identifier parameter. The port identifier parameter is a parameter that specifies which port on communications management unit 520 is associated with a particular client.

For example, engine monitoring unit 3 506 may send information to uplink and downlink service 514 with a port identifier parameter specifying one of the five ports on communications management unit 520. In these examples, communications management unit 520 has port 1 524, port 2 526, port 3 528, port 4 530, and port 5 532. For engine monitoring unit 3 506, the port identifier parameter identifies port 2 526. Although names of clients are used in these illustrative examples, some other identifier may be associated with a client to identify a parameter for use in sending information for a client. For example, each client may be assigned a unique identifier. The unique identifier may be, for example, a media access control (MAC) address.

Once the port parameter identifier has been determined, uplink and downlink service 514 determines which network extension device is configured to send and receive information for the particular port identified. For engine monitoring unit 3 506, network extension device 1 516 is identified. Uplink and downlink service 514 may also identify a communication service to be used for sending the downlink request based on a communication service name parameter.

Thereafter, uplink and downlink service 514 submits the downlink request to network extension device 1 516. Uplink and downlink service 514 does not change the information sent by engine monitoring unit 3 506. In other words, uplink and downlink service 514 encapsulates the information without changing the original format or data type of the information sent by engine monitoring unit 3 506. Uplink and downlink service 514 encapsulates the information using a protocol associated with the identified communication service. In these examples, uplink and downlink service 514 and network extension device 1 516 may be connected by physical interface 534.

Network extension device 1 516 sends the encapsulated information to port 2 526 of communications management unit 520 using bus system 536. Bus system 536 may be one example of bus system 342 in FIG. 3. Communications management unit 520 is capable of converting the received information into a format capable of being sent to a ground system.

Also in these examples, an exchange of information as initiated by an uplink notification such as, for example, uplink notification 326 in FIG. 3 may be illustrated in FIG. 5. Communications management unit 520 receives information from a ground system. This information may be, for example, without limitation, a message and/or uplink notification from a ground system.

Communications management unit 520 converts the information using a protocol associated with the communication service identified in the information. Communications management unit 520 uses port 5 532 to send the information to network extension device 2 518 on bus system 536. Network extension device 2 518 may be the particular network extension device associated with port 5 532.

Network extension device 2 518 notifies uplink and downlink service 514 that information has been received. Uplink and downlink service 514 requests an uplink from network extension device 2 518 to retrieve the information and a message format identifier. Uplink and downlink service 514 uses the message format identifier value to identify the intended recipient and client of the information. In these examples, client 6 512 is identified. Thereafter, uplink and downlink service 514 notifies client 6 512 that the information has arrived. Client 6 512 may then submit an uplink request to uplink and downlink service 514 to retrieve the information.

Figure 6:
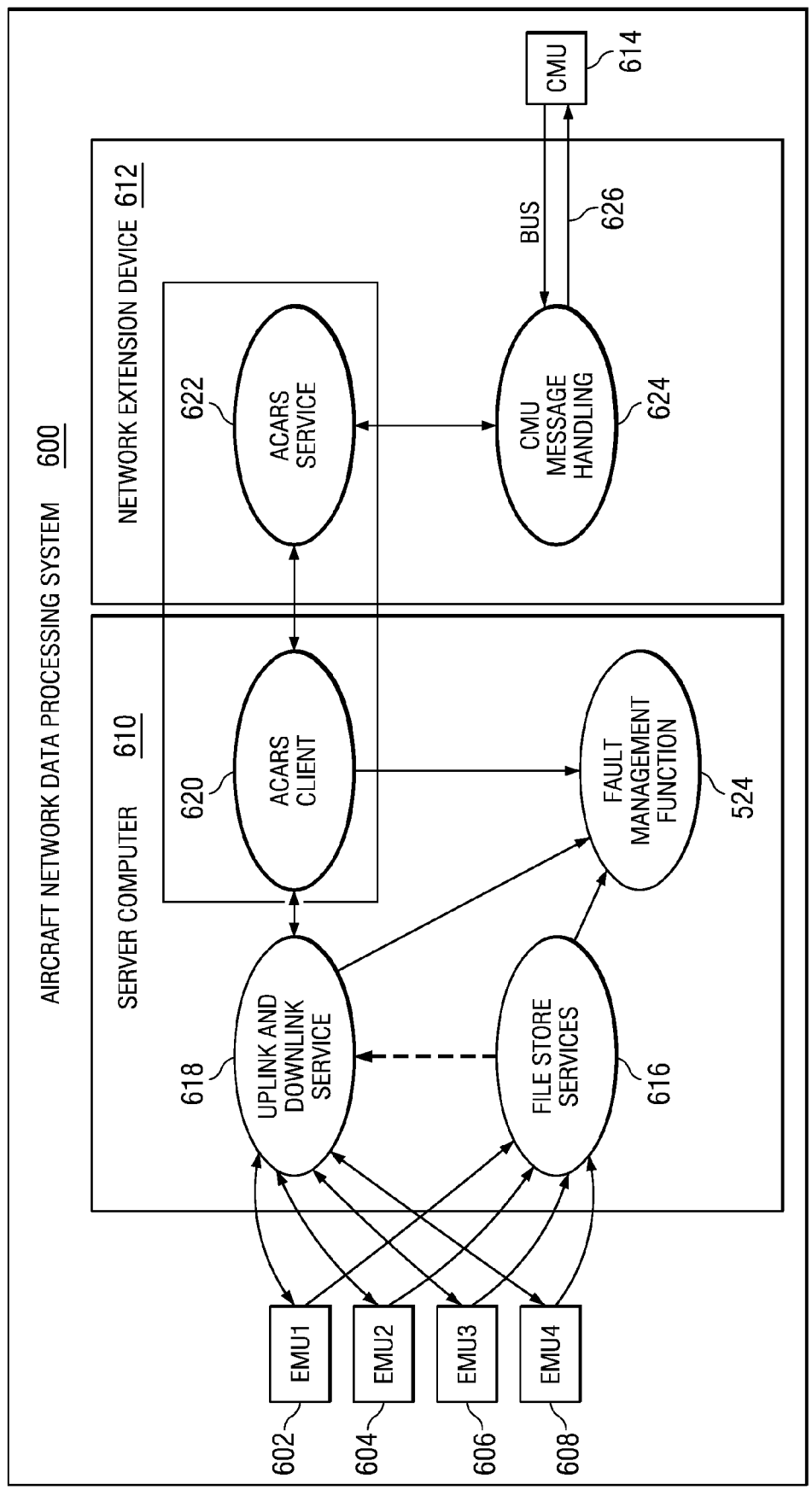
FIG. 6 is a diagram of a portion of an aircraft network data processing system in accordance with an advantageous embodiment.

With reference now to FIG. 6, a diagram of a portion of an aircraft network data processing system is depicted in accordance with an advantageous embodiment. Aircraft network data processing system 600 may be another example of one implementation for aircraft network data processing system 306 in FIG. 3.

In these illustrative examples, aircraft network data processing system 600 includes clients such as, for example, engine monitoring unit 1 602, engine monitoring unit 2 604, engine monitoring unit 3 606, and engine monitoring unit 4 608. Further, aircraft network data processing system 600 also includes server computer 610, network extension device 612, and communications management unit 614.

The clients, engine monitoring unit 1 602, engine monitoring unit 2 604, engine monitoring unit 3 606, and engine monitoring unit 4 608, may send and receive information from file store service 616 located on server computer 610. File store service 616 may be a private file storage area on a server computer of an aircraft such as, for example, file storage service 327 in FIG. 3 on server computer 310. Further, engine monitoring unit 1 602, engine monitoring unit 2 604, engine monitoring unit 3 606, and engine monitoring unit 4 608 may also send and receive information to and from uplink and downlink service 618. Uplink and downlink service 618 provides a common hub for the exchange of information.

Uplink and downlink service 618 may send and receive information to and from aircraft communications addressing and reporting system (ACARS) client 620. Aircraft communications addressing and reporting system (ACARS) client 620 is a software process for a sub-function executing on server computer 610. This client software process supports interfacing with uplink and downlink service 618 to send and receive messages to and from clients, such as engine monitoring unit 1 602, engine monitoring unit 2 604, engine monitoring unit 3 606, and engine monitoring unit 4 608.

Further, this client software process handles information in the aircraft communications addressing and reporting system (ACARS) format as binary information. Aircraft communications addressing and reporting system (ACARS) client 620 sends and receives information to and from network extension device 612.

Network extension device 612 may send and receive information to and from aircraft communications addressing and reporting system (ACARS) client 620 using aircraft communications addressing and reporting system (ACARS) service 622. This service software process is a sub-function of software executing on network extension device 612. In these examples, aircraft communications addressing and reporting system (ACARS) service 622 supports aircraft communications addressing and reporting system (ACARS) protocols and is used to interface with communications management unit 614 to send and receive information to and from communications management unit 614.

The service software process interfaces with communications management unit 614 using communications management unit message handling 624. Communications management unit message handling 624 uses bus system 626 to send and receive information to and from communications management unit 614. In these examples, bus system 626 may be implemented using an ARINC 429 bus system as developed by Aeronautical Radio, Incorporated (ARINC).

Further, aircraft communications addressing and reporting system (ACARS) client 620, uplink and downlink service 618, and file store service 616 may send error and fault information to fault management function 628.

With reference now to FIG. 7, a block diagram of a message format for a message is depicted in accordance with an advantageous embodiment. Message 700 may be one example of an Aeronautical Radio, Incorporated (ARINC) 619 message that may be sent to and/or received from components within an aircraft network data processing system such as, for example, aircraft network data processing system 306 in FIG. 3.

An Aeronautical Radio, Incorporated (ARINC) 619 message is a message that uses the ARINC 619 standard or protocol for the format of the message. In these examples, message 700 may be a message for a downlink request from or an uplink notification to a client within clients 308 in FIG. 3.

Message 700 has header 702 and user data 704. Header 702 may identify five different parameters, which include origin 706, message purpose 708, destination 710, media 712, and priority 714. Origin 706 specifies the network from which the uplink message was received. Message purpose 708 provides the purpose of the message or the status of the message.

Destination 710 specifies the intended destination of the message. Media 712 is used to select specific allowable media for a message.

Priority 714 specifies a priority value, such as priority value 716, for downlink messages. The specified priority may be based on definitions within a communications management unit. Further, priority 714 may also specify life time 718. For example, for a downlink message, life time 718 may be a value specifying how long to queue a message if the message is not able to be immediately downlinked.

User data 704 represents the message payload. User data 704 may include message format identifier 720. Message format identifier 720 specifies how to route the message to an onboard destination. For example, message format identifier 720 may be a value specifying a particular line replaceable unit on an aircraft as the destination for message 700.

Supplemental address 722 may be another field within user data 704. Supplemental address 722 may specify how to route the message to a ground destination. Application data 724 may be a field within user data 704 that specifies end system specific data.

With reference now to FIG. 8, a block diagram of downlink request parameters is depicted in accordance with an advantageous embodiment. Downlink request parameters 800 may be examples of parameters that may be included in a downlink request such as, for example, parameters 323 for downlink request 324 in FIG. 3.

Downlink request parameters 800 may include message type 802, communication service 804, message priority 806, number of retries 808, expiration 810, payload 812, and/or other suitable parameters. Message type 802 is the file or data type of the information that is being requested for downlink. For example, message type 802 may be an onboard electronic distribution system (OBEDS) data type, an aircraft communications addressing and reporting system (ACARS) data type, binary, and/or some other suitable data type.

Communication service 804 indicates the specific communication service to use. For example, communication service 804 may be a specific communication service within communication services 332 in FIG. 3, as requested by client software such as, for example, client software 320 in FIG. 3. Message priority 806 is the level of priority for the message. Message priority 806 may be used to prioritize a message among a group of pending downlink requests that are submitted by the same client.

Number of retries 808 specifies the number of attempts for sending the file before stopping. Expiration 810 specifies the period of time during which to hold the file before stopping sending the file. Payload 812 is the file content. Payload 812 may also be the location of a payload file. For example, payload 812 may reference a location in a private file storage service area on a server computer, such as file storage service 327 on server computer 310 in FIG. 3.

With reference now to FIG. 9, a block diagram of uplink notification parameters is depicted in accordance with an advantageous embodiment. Uplink notification parameters 900 are examples of parameters for an uplink notification such as, for example, parameters 325 for uplink notification 326 in FIG. 3.

In these illustrative examples, uplink notification parameters 900 include, without limitation, communication service name 902, message originator 904, message or file size 906, data type 908, message expiration 910, message status 912, message identifier 914, transaction identifier 916, and/or other suitable parameters. Communication service name 902 specifies the communication service to be used in the exchange of information. Message originator 904 specifies the name of the system originating the uplink notification. Message or file size 906 identifies the size of the notification and/or size of the file to be uplinked.

Data type 908 specifies the data type of the message and/or file. Message expiration 910 may indicate a period of time for holding the file or message before stopping sending the notification and/or file. Message status 912 specifies the status of the message. For example, message status 912 may have a value of "pending", "sent", "expired", and/or some other suitable value. Message identifier 914 provides a value that identifies the particular message or file within an aircraft network data processing system. Transaction identifier 916 provides a value that helps associate the message with the response locally between the client and the server computer.

Figure 10:
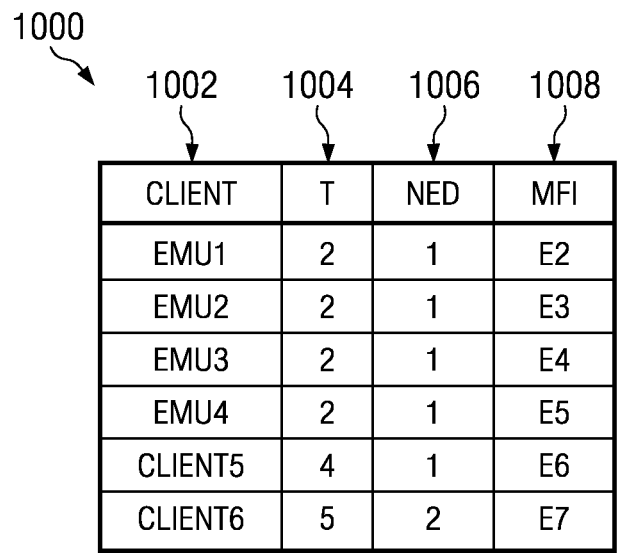
FIG. 10 is a table of associations in accordance with an advantageous embodiment.

With reference now to FIG. 10, a table of associations is depicted in accordance with an advantageous embodiment. Table 1000 may be one example of a table used by an uplink and downlink service such as, for example, uplink and downlink service 514 in FIG. 5.

Table 1000 may include columns 1002-1008. In these illustrative examples, column 1002 specifies the name of a client. Column 1004 specifies the cabin terminal identifier to be used in association with a particular client. Column 1006 specifies the network extension device to be used in association with a particular client and/or cabin terminal identifier. Column 1008 specifies the message format identifier value to be used in order to identify the name of the client.

Figure 11:
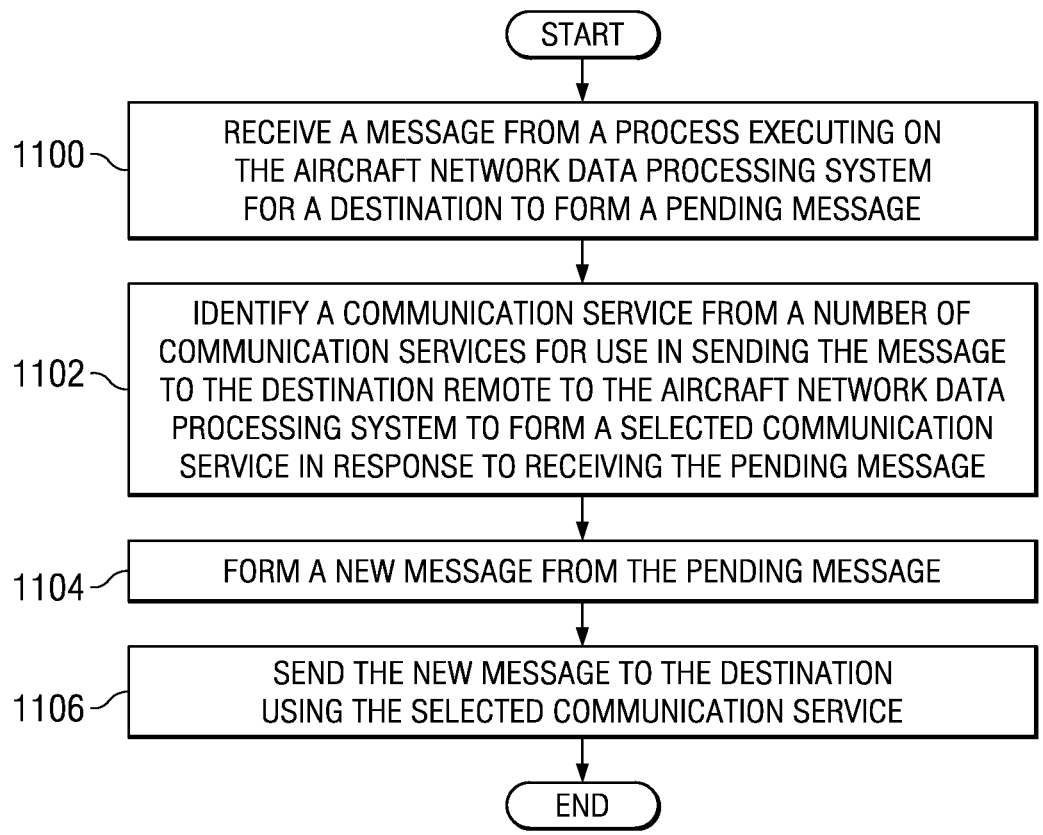
FIG. 11 is a flowchart of a process for transferring information in an aircraft network data processing system in accordance with an advantageous embodiment.

With reference now to FIG. 11, a flowchart of a process for transferring information in an aircraft network data processing system is depicted in accordance with an advantageous embodiment. The process illustrated in FIG. 11 may be implemented in an aircraft network data processing system such as, for example, aircraft network data processing system 306 in FIG. 3.

The process begins by receiving a message from a process executing in the aircraft network data processing system for a destination to form a pending message (operation 1100). The pending message is received using a common protocol for processes executing in the aircraft network data processing system. The process then identifies a communication service from a number of communication services for use in sending the message to the destination remote to the aircraft network data processing system to form a selected communication service in response to receiving the pending message (operation 1102).

Thereafter, the process forms a new message from the pending message, wherein the new message has a format usable by an associated protocol for the selected communication service (operation 1104). The process then sends the new message to the destination using the selected communication service (operation 1106), with the process terminating thereafter.

Figure 12:
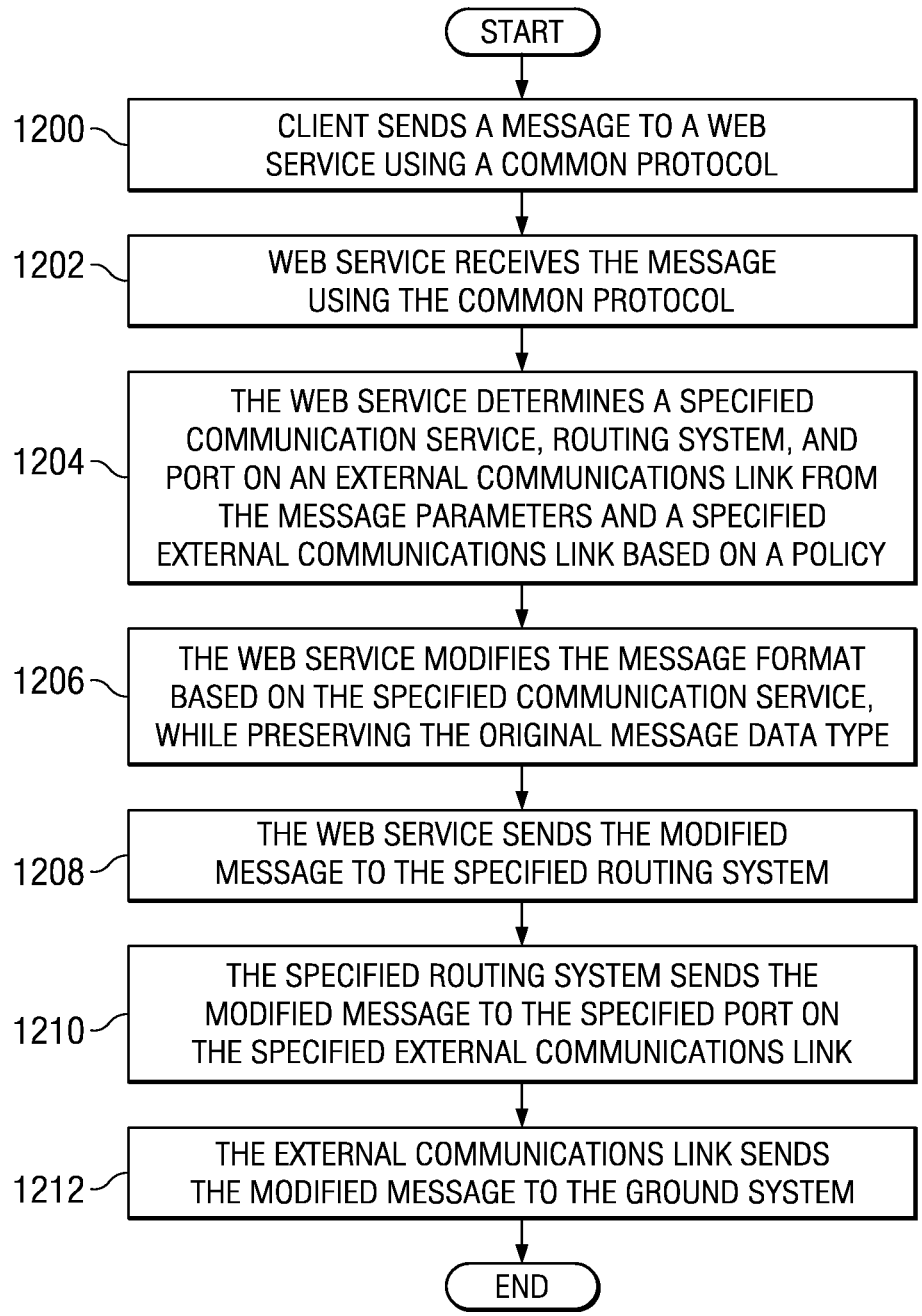
FIG. 12 is a flowchart of a process for sending a message from an aircraft to a ground system in accordance with an advantageous embodiment.

With reference now to FIG. 12, a flowchart of a process for sending a message from an aircraft to a ground system is depicted in accordance with an advantageous embodiment. The process illustrated in FIG. 12 may be implemented in a data exchange environment such as, for example, data exchange environment 300 using aircraft network data processing system 306 in FIG. 3.

The process begins with a client sending a message to a web service using a common protocol (operation 1200). The web service receives the message using the common protocol (operation 1202). The web service determines a specified communication service, routing system, and port on an external communications link from the message parameters and a specified external communications link based on a policy (operation 1204). The web service modifies the message format based on the specified communication service, while preserving the original message data type (operation 1206). The web service then sends the modified message to the specified routing system (operation 1208).

Thereafter, the specified routing system sends the modified message to the specified port on the specified external communications link (operation 1210). The external communications link sends the modified message to the ground system (operation 1212), with the process terminating thereafter.

Figure 13:
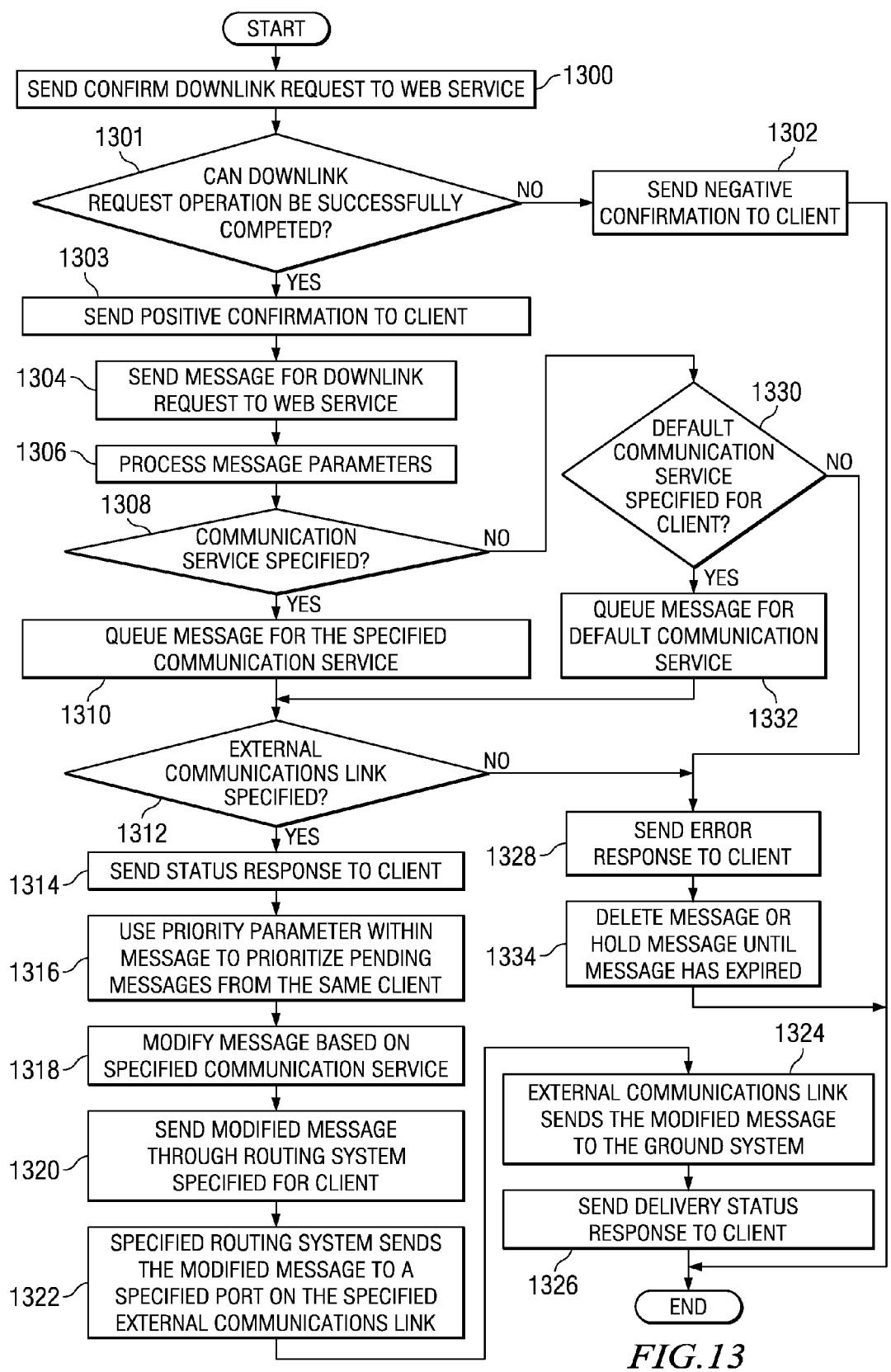
FIG. 13 is a flowchart of a process for sending a message from an aircraft to a ground system in accordance with an advantageous embodiment.

With reference now to FIG. 13, a flowchart of a process for sending a message from an aircraft to a ground system is depicted in accordance with an advantageous embodiment. In these examples, the process illustrated in FIG. 13 is a more detailed process of the process illustrated in FIG. 12. Further, the process illustrated in FIG. 13 may be implemented in an aircraft network data processing system such as, for example, aircraft network data processing system 306 in FIG. 3.

The process begins when a client has a downlink request for a ground system. The client may be any line replaceable unit or other component within an aircraft. The client sends a confirm downlink request to the web service (operation 1300). The web service is executing on a server computer within the aircraft. The web service determines whether a downlink request operation can be successfully completed (operation 1301). If the downlink request operation cannot be successfully completed, the web service sends a negative confirmation to the client (operation 1302), with the process terminating thereafter. Otherwise, if the downlink request operation can be successfully completed, the web service sends a positive confirmation to the client (operation 1303).

Thereafter, the client sends the message for the downlink request to the web service (operation 1304). The web service processes the parameters of the message (operation 1306). The web service determines whether a communication service has been specified in a parameter in the message (operation 1308). If a communication service has been specified, the web service queues the message for the specified communication service (operation 1310).

The web service also determines whether an external communications link has been specified for the client (operation 1312). The external communications link may be specified by a default external communications link for the client in a configuration log file loaded into the web service. This configuration log file may have a policy that selects a particular communications link for a particular client based on rules such as, for example, availability, quality of service, and/or cost.

In other examples, the external communications link to be used may be specified in a published web services definition language (WSDL) document loaded into the software. The client may then select an external communications link for sending the message based on the information provided within the published web services definition language (WSDL) document.

If an external communications link has been specified for the client, the web service sends a status response to the client (operation 1314). This status response may indicate that the message is now pending. The web service may then use the priority parameter within the message to prioritize pending messages from the same client (operation 1316). Thereafter, the web service may modify the message based on the specified communication service (operation 1318).

The modified message is sent through a routing system specified for the client (operation 1320). The specified routing system then sends the modified message to a specified port on the specified external communications link (operation 1322). The external communications link sends the modified message to the ground system (operation 1324). Thereafter, the web service sends a delivery status response to the client (operation 1326), with the process then terminating.

With reference again to operation 1312, if no external communications link has been specified for the client, the web service sends an error response to the client (operation 1328). The web service then either deletes the message or holds the message until the message has expired (operation 1334), with the process terminating thereafter. The expiration time for the message may be based on a value specified in a parameter in the message.

With reference again to operation 1308, if a communication service has not been specified by the client, the web service determines whether a default communication service has been specified for the particular client (operation 1330). If no default communication service has been specified, the web service proceeds to operation 1328 as described above. If a default communication service has been specified, the web service queues the message for the default communication service (operation 1332). The process then proceeds to operation 1312 as described above.

Figure 14:
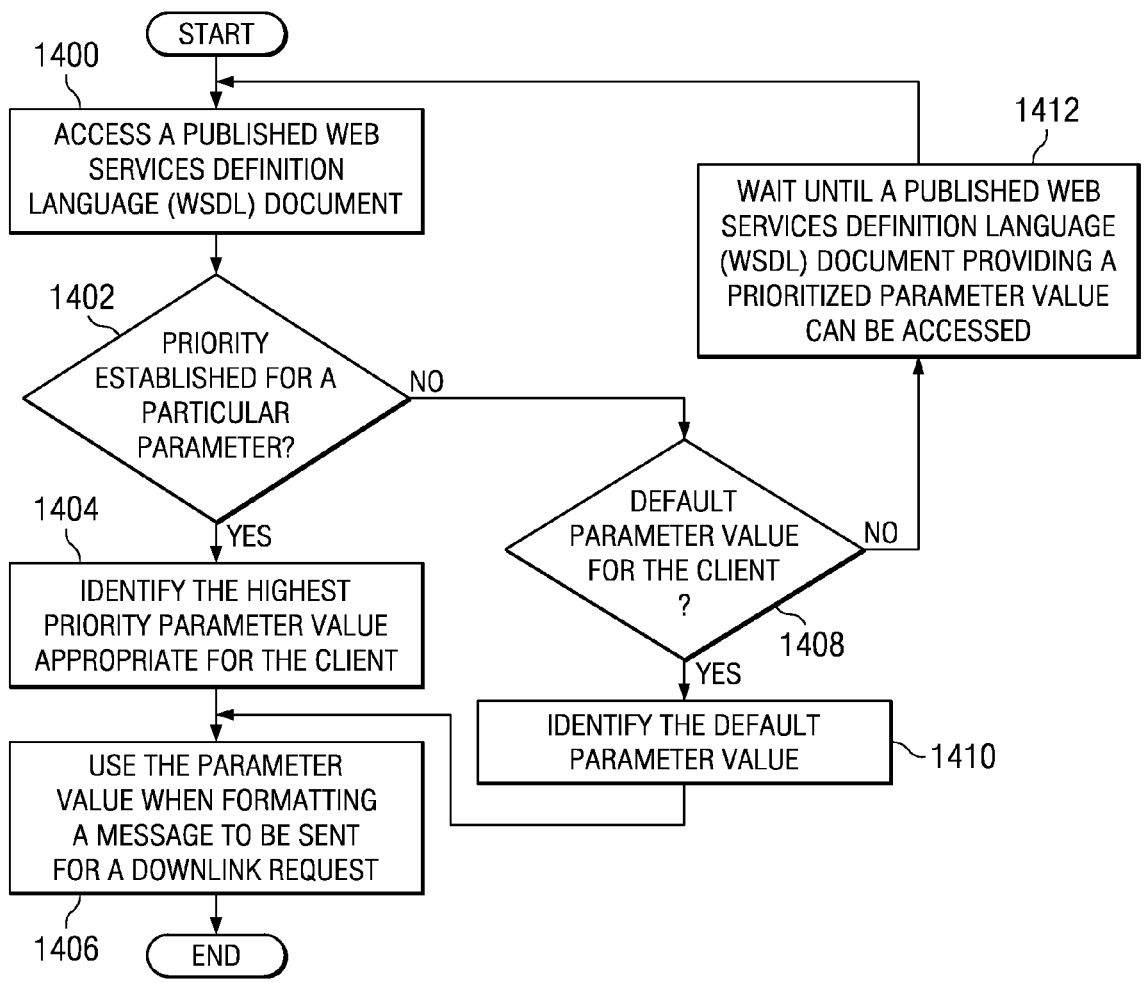
FIG. 14 is a flowchart of a process for a client identifying a parameter in accordance with an advantageous embodiment.

With reference now to FIG. 14, a flowchart of a process for a client identifying a parameter is depicted in accordance with an advantageous embodiment. The process illustrated in FIG. 14 may be implemented in an aircraft network data processing system such as, for example, aircraft network data processing system 306 in FIG. 3. In these illustrative examples, a client, such as a client within clients 308 in FIG. 3, may identify a parameter to be used when sending a downlink request.

The process begins with a published web services definition language (WSDL) document being accessed by the client (operation 1400). The client determines whether a priority has been established for a particular parameter (operation 1402). In these examples, the parameter may be the communication service that is to be used, the external communications link to be used, or some other parameter. If a priority has been established for a particular parameter for the client, the client identifies the highest priority parameter value appropriate for the client (operation 1404). The client uses this parameter value when formatting a message to be sent for a downlink request (operation 1406), with the process terminating thereafter.

With reference again to operation 1402, if a priority has not been established for a particular parameter for the client, the client determines whether there is a default parameter value for the client (operation 1408). If there is a default parameter value, the client identifies the default parameter value (operation 1410). The process then continues to operation 1406 as described above. Otherwise, if there is no default parameter value, the client waits until a published web services definition language (WSDL) document providing a prioritized parameter value can be accessed (operation 1412), with the process then returning to operation 1400 as described above.

The flowcharts and block diagrams in the different depicted embodiments illustrate the architecture, functionality, and operation of some possible implementations of apparatus, methods, and computer program products.

In this regard, each block in the flowcharts or block diagrams may represent a module, segment, or portion of computer usable or readable program code, which comprises one or more executable instructions for implementing the specified function or functions. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer-usable or computer-readable medium providing program code for use by, or in connection with, a computer or any device or system that executes instructions. For the purposes of this disclosure, a computer-usable or computer-readable medium can generally be any tangible apparatus that can contain, store, communicate, propagate, or transport the program for use by, or in connection with, the instruction execution system, apparatus, or device.

The computer-usable or computer-readable medium can be, for example, without limitation, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for transferring information in an aircraft network data processing system, the method comprising:
    receiving a message from a process executing in the aircraft network data processing system for a destination to form a pending message, wherein the pending message is received using a standard protocol for processes executing in the aircraft network data processing system;
    responsive to receiving the pending message, identifying a communication service from a number of communication services for use in sending the message to the destination remote to the aircraft network data processing system using a policy to form a selected communication service, wherein the policy is selected from a number of rules that include availability, quality of service, and cost;
    forming a new message from the pending message, wherein the new message has a format usable by an associated protocol for the selected communication service; and
    sending the new message to the destination using the selected communication service.

2. The method of claim 1, further comprising:
    responsive to receiving the new message from the selected communication service in the number of communication services for the process, forming a received message;
    forming a current message from the received message, wherein the current message has a format usable by the standard protocol for the processes; and
    sending the current message to the process using the standard protocol.

3. The method of claim 1, wherein the identifying step comprises:
    responsive to receiving the pending message, identifying the communication service from the number of communication services for use in sending the message to the destination from a number of selections for the communication service in the message to form the selected communication service.

4. The method of claim 1, wherein the process is executed on a line replaceable unit in the aircraft network data processing system.

5. The method of claim 1, wherein the receiving, identifying, forming, and sending steps are executed in a server computer in the aircraft network data processing system.

6. The method of claim 1, wherein the receiving, identifying, forming, and sending steps are part of web services.

7. The method of claim 1 further comprising:
    receiving another message from the process for the destination in the aircraft network data processing system to form a second pending message, wherein the second pending message is received using the standard protocol for processes executing in the aircraft network data processing system; and sending the message to the destination in the aircraft network data processing system using the standard protocol.

8. An aircraft network data processing system comprising:
   a network;
   a plurality of line replaceable units connected to the network;
   a number of server computers connected to the network; and
   a server process capable of being executed on the number of server computers to receive a message from a process executing on a line replaceable unit in the aircraft network data processing system for a destination to form a pending message, wherein the pending message is received using a standard protocol for processes executing on the plurality of line replaceable units in the network data processing system; identify a communication service from a number of communication services for use in sending the message to the destination remote to the aircraft network data processing system using a policy to form a selected communication service in response to receiving the pending message, wherein the policy is selected from a number of rules that include availability, quality of service, and cost; form a new message from the pending message, wherein the new message has a format usable by an associated protocol for the selected communication service; and send the new message to the destination using the selected communication service.

9. The aircraft network data processing system of claim 8, wherein the server process is further capable of being executed to form a received message in response to receiving the new message from the selected communication service in the number of communication services for the process; forming a current message from the received message, wherein the current message has a format usable by the standard protocol for the processes; and sending the current message to the process using the standard protocol.

10. The aircraft network data processing system of claim 8, wherein in identifying the communication service from the number of communication services for use in sending the message to the destination remote to the aircraft network data processing system to form the selected communication service in response to receiving the pending message, the server process is capable of being executed to identify the communication service from the number of communication services for use in sending the message to the destination from a number of selections for the communication service in the message to form the selected communication service in response to receiving the pending message.

11. The aircraft network data processing system of claim 8 further comprising:
   a number of network extension devices in communication with the number of server computers.

12. A computer program product for transferring information in an aircraft network data processing system, the computer program product comprising:
   a nontransitory computer recordable storage medium;
   program code, stored on the computer recordable storage medium, for receiving a message from a process executing in the aircraft network data processing system for a destination to form a pending message, wherein the pending message is received using a standard protocol for processes executing in the aircraft network data processing system;
   program code, stored on the computer recordable storage medium, for identifying a communication service from a number of communication services for use in sending the message to the destination remote to the aircraft network data processing system using a policy to form a selected communication service in response to receiving the pending message, wherein the policy is selected from a number of rules that include availability, quality of service, and cost;
   program code, stored on the computer recordable storage medium, for forming a new message from the pending message, wherein the new message has a format usable by an associated protocol for the selected communication service; and
   program code, stored on the computer recordable storage medium, for sending the new message to the destination using the selected communication service.

13. The computer program product of claim 12 further comprising:
   program code, stored on the computer recordable storage medium, for forming a received message in response to receiving the new message from the selected communication service in the number of communication services for the process;
   program code, stored on the computer recordable storage medium, for forming a current message from the received message, wherein the current message has a format usable by the standard protocol for the processes; and
   program code, stored on the computer recordable storage medium, for sending the current message to the process using the standard protocol.

14. The computer program product of claim 12, wherein the program code, stored on the computer recordable storage medium, for identifying the communication service from the number of communication services for use in sending the message to the destination remote to the aircraft network data processing system to form the selected communication service in response to receiving the pending message comprises:
   program code, stored on the computer recordable storage medium, for identifying the communication service from the number of communication services for use in sending the message to the destination from a number of selections for the communication service in the message to form the selected communication service in response to receiving the pending message.

15. The computer program product of claim 12, wherein the program code, stored on the computer recordable storage medium, for the receiving, identifying, forming, and sending processes are part of web services.

16. The computer program product of claim 12 further comprising:
   program code, stored on the computer recordable storage medium, for receiving another message from the process for the destination in the aircraft network data processing system to form a second pending message, wherein the second pending message is received using the standard protocol for processes executing in the aircraft network data processing system; and
   program code, stored on the computer recordable storage medium, for sending the message to the destination in the aircraft network data processing system using the standard protocol.

* * * * *